Feb. 19, 1952  J. H. GODFREY  2,586,530
SAW BLADE HOLDING MEANS
Filed July 8, 1948
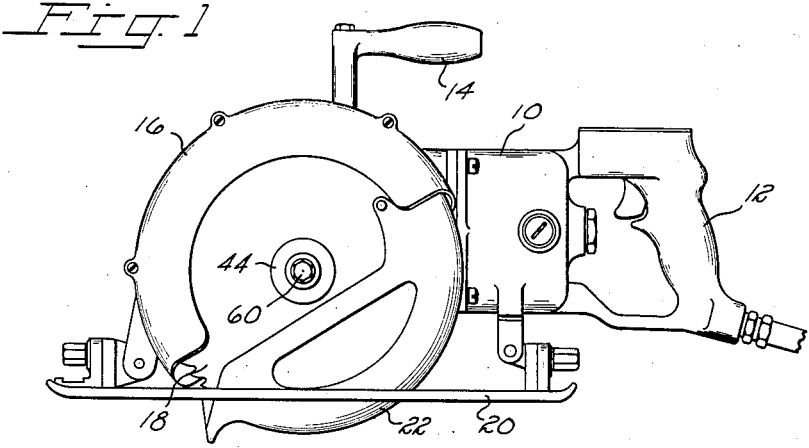
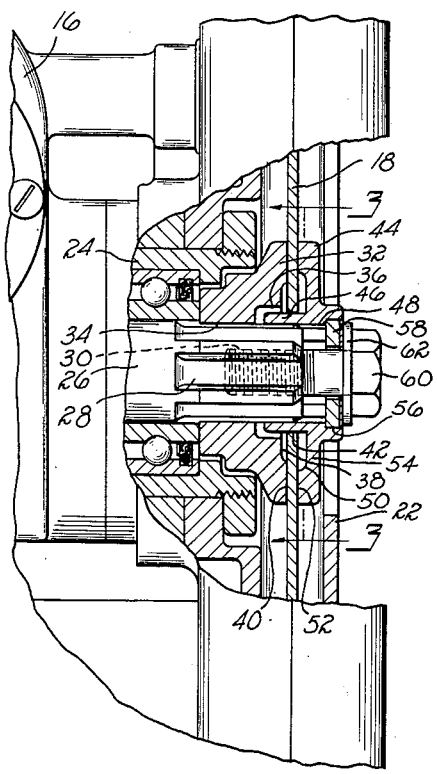
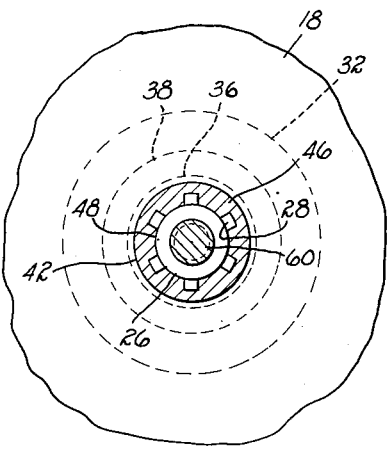
Inventor
JAMES H. GODFREY
By Lindsey, Prutzman + Just
Attorneys Patented Feb. 19, 1952

2,586,530

UNITED STATES PATENT OFFICE 2,586,530

SAW BLADE HOLDING MEANS

James H. Godfrey, Berlin, Conn., assignor to The Stanley Works, New Britain, Conn., a corporation of Connecticut Application July 8, 1948, Serial No. 37,582

2 Claims. (Cl. 143—155)

1

This invention relates to improvements in saw blade holding means and, more particularly, but without limitation thereto, to means for holding a saw blade on the arbor of a portable power saw.

Heretofore, numerous attempts have been made to secure a rotary saw blade to a power driven arbor by means which will prevent slippage between the blade and arbor. For example, irregularly shaped openings have been provided in the center of the saw blade and a corresponding shape has been provided on the arbor or one of the clamping flanges, whereby no relative movement would be possible between the blade and arbor. Dowel pins have also been used between the clamping flange on the arbor and the saw blade. However, these and other similar means have proven unsatisfactory in that, when a shock or overload was imposed upon the blade, no yielding between the blade and arbor was permitted and thus the shock or overload was transmitted to the power means of the saw, such as an electric motor, for example. In instances where yielding did occur, such as the dowels being severed, they had to be replaced before driving the blade could be resumed.

In order to overcome the foregoing disadvantages, saw blade holding means comprising a flange keyed to the arbor was used in conjunction with a saw blade having a circular central opening which received the arbor, and a clamping flange having a circular central opening was mounted on said arbor and secured in clamping arrangement with said blade by a screw or nut which was threadably connected to the end of the arbor and engaged the clamping flange to hold the blade clamped between it and the clamping flanges. In using this arrangement, slippage was permitted between the blade and the driving flange when the blade was subjected to shocks or overload and thus the latter were not transmitted to the power means of the saw.

However, slipping movement of the saw relative to the arbor and driving flange occasioned rotative movement of the clamping flange with the blade and the frictional engagement between the clamping flange and the clamping nut or bolt head caused the nut or bolt to also be rotated in tightening direction. This resulted in the blade being clamped extremely tight and it could be detached from the arbor only with great difficulty. Further, under some circumstances where the amount of slippage between the blade and clamping flange was great enough, due, for

2 example, to numerous shocks or overloads being encountered by the blade, the tightening action occasioned by such slippage was severe enough to cause the bolt to be severed in situations where a bolt was used to secure the clamping flange to the arbor.

It is an object of the present invention to provide blade holding and clamping means in a power driven saw whereby the blade may slip relative to the arbor and clamping means when an overload or a shock is imposed upon the saw such as when a hard object is engaged by the saw teeth or the blade is pinched in a saw cut. It is an aim of the invention that no tightening of the clamping flanges relative to the blade will take place when the blade slips under these conditions relative to the arbor and clamping flanges. It is a further aim of the invention to prevent such tightening when the blade slips by keying both the driving and clamping flanges to the arbor. A still further aim of the invention is to form the clamping flange so as to have a relatively thin section which is flexible and will serve to retain a clamping screw or nut against rotation when mounted in operative clamping position relative to the clamping flange of the blade holding means.

Other objects and aims of the invention as well as details of the foregoing are set forth in the following specification and illustrated in the accompanying drawing forming a part thereof.

In the drawing:

Figure 1 is a side view of a power saw embodying the principles of the invention;

Fig. 2 is an enlarged, fragmentary, front end view of a portion of the saw illustrated in Fig. 1, part of the casing of the saw being broken away to illustrate in section details of the blade holding means comprising the invention; and Fig. 3 is a fragmentary, sectional view taken on the line 3—3 of Fig. 2 and illustrating a detail of the arbor and blade clamping flange comprising part of the present invention.

Referring to Fig. 1, a power saw to which the present invention is applicable comprises a motor casing 10 having a handle 12 secured to one end thereof. Another handle 14 is secured either to the motor casing 10 or a part of casing 16 which houses the gear reduction means, not shown, and also shields the rotary saw blade 18. The casing 16 is also provided with a slidable guide shoe 20 which slides on a surface of the material being sawed. A movable blade guard 22 is also shown. None of the foregoing items comprises part of the present invention, but the same are described in order that the invention may be more fully understood.

Mounted within a ball bearing assembly 24 and projecting outward from one side of that portion of the casing 16 which houses the gear reduction unit is a rotatable arbor 26 provided with splines 28. The arbor 26 is rotated by the gear reduction assembly referred to above which, in turn, is driven by an electric motor within the casing 10. The outer end of arbor 26 is provided with an internally threaded aperture 30 for purposes to be described.

A driving flange 32 is provided with a central opening 34 which is preferably complementary in shape to the splined configuration of the arbor 26, whereby the driving flange 32 is keyed to the arbor. Extending inward from one side or face of the driving flange 32 is an annular recess or cavity 36 for purposes to be described. Also, the same side surface of the driving flange 32 is preferably relieved as shown at 38 so as to provide an annular flat clamping surface 40 disposed adjacent the rim of the driving flange 32, said clamping surface 40 being arranged to engage one surface of the rotary saw blade 18. The blade 18 is provided with a central circular aperture 42.

A clamping flange 44 is provided with a sleeve-like hub 46 which extends toward the driving flange 32 from the inner side or face of the clamping flange 44. The outer surface of hub 46 is cylindrical and is disposed within the central aperture 42 of the blade 18. Preferably, the diameters of the aperture 42 and hub 46 are substantially the same in order that there will be a close fit between the blade aperture and the hub since said hub comprises the means for radially positioning the blade relative to the arbor 26.

The hub 46 of clamping flange is also provided with a central aperture 48 which is complementary in shape to the splined configuration of arbor 26. As is readily seen from Fig. 2, the hub of the clamping flange 44 is disposed on the outer end portion of the splined arbor 26, whereby clamping flange 44 is keyed to said arbor. Since driving flange 32 is also keyed to said arbor, no relative rotative motion is possible between driving flange 32 and the clamping flange 44. When the clamping flange 44 is mounted with the hub 46 disposed on the outer end of arbor 26, the inner end of the hub 46 is received within the cavity 36 formed in driving flange 32. Such an arrangement makes possible the provision of longer splines in the central aperture in the hub of clamping flange 44.

A cavity or relief 50 is also provided on the inner surface of clamping flange 44, whereby an annular, flat blade engaging surface 52 is provided on clamping flange 44 adjacent its outer rim. This relief arrangement also provides a relatively thin wall section 54 between the clamping surface 52 of the clamping flange 44 and the hub 46. The clamping flange 44 is formed from material capable of being heat treated to produce a spring temper therein. Thus, said clamping flange has limited flexibility in the wall section 54 between the annular blade engaging surface 52 and the hub 46 thereof.

The outer end of hub 46 is also preferably provided with an annular recess 56 which accommodates a washer 58. A bolt or screw 60 is threadably received within the internally threaded aperture 30 in the end of arbor 26 and passes through the aperture in washer 58. Disposed between the head of screw 60 and washer 58 is an additional and preferably a lock washer 62. In view of the provision of lock washer 62 as well as the limited flexibility of wall section 54 of clamping flange 44, the screw 60 is prevented from becoming loosened after it has been tightened in flange clamping position.

In view of the foregoing construction, and particularly the formation of clamping flange 44 and the limited flexibility thereof, it will be seen that the blade 18 is resiliently clamped on the arbor 26 between driving flange 32 and clamping flange 44 by an arrangement which will permit slippage between said blade and the flanges when an overload or shock is imposed upon the saw during its operation. However, in view of the keying of both the driving flange and the clamping flange 44 to the arbor, no relative motion is possible between said flanges when the blade slips relative thereto and thus the clamping action of the screw 60 is in no way intensified as it was in previously used constructions when slippage of the blade occurred. It is immaterial whether the threads on the screw 60 and within the aperture 30 are right-handed or left-handed since no relative movement between the flanges 32 and 44 is possible during use. The foregoing construction is also such that slippage will take place between the blade and the flanges 32 and 44 when shock or overload is imposed upon the blade without transmitting such shock or overload to either the gear reduction assembly or motor of the power saw.

In the foregoing description and the appended claims, the terms "driving flange" and "clamping flange" have been arbitrarily selected only in order to readily distinguish between them. Actually, they are both driving and clamping flanges and no special significance is to be imputed to these terms except for distinguishing purposes.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. In a power saw including a splined arbor and a rotary saw blade having a circular central opening permitting rotation of said blade relative to said arbor, the combination of means to connect said blade to said arbor adjacent one end thereof comprising a clamping flange having a sleeve-like hub extending from one side and provided with a cylindrical outer surface complementary to and disposed within the central opening of said blade and extending beyond both sides of the saw blade, said clamping flange having limited flexibility and an annular surface adjacent its rim arranged to engage one surface of said saw blade, a driving flange having a cavity in one side to receive said sleeve-like hub, said driving flange and sleeve-like hub on said clamping flange having central openings receiving said arbor and also being provided with means to engage a spline of said arbor to key both of said flanges thereto and said blade being mounted between said flanges, and a screw threadably engaging said end of said arbor and also interengaging one end of said sleeve-like hub of said clamping flange to urge said annular surface thereof into resilient clamping engagement with said one surface of said saw blade, said blade upon encountering an abnormal obstruction overcoming said clamping engagement and thereupon being rotatable relative to said arbor and flanges.

2. In a power saw having a splined arbor rotatably mounted by a bearing unit and a rotary saw blade provided with a central opening permitting rotation of the saw blade relative to the arbor, the combination of means to connect the blade to the arbor adjacent one end thereof comprising a first clamping and driving flange abutting the bearing unit and having a peripheral portion engaging one face of the saw blade and an annular recess surrounding a central arbor opening, said first flange also having means engaging a spline of the arbor, a second driving and clamping flange having a peripheral portion engaging the other face of the saw blade and a sleeve-like hub having one end extending into and through the saw blade opening in snug fitting relation thereto, said hub having a central opening receiving the arbor and having means engaging a spline thereof on both sides of the saw blade, said second flange having an integrally formed resilient body portion of reduced thickness interconnecting said hub and said peripheral portion, and screw means threadably engaging the end of the arbor and engaging the other end of said hub to urge said peripheral portion of said second flange into resilient clamping engagement with said other face of the saw blade.

JAMES H. GODFREY.

REFERENCES CITED

The following references are of record in the file of this patent:

UNITED STATES PATENTS

| Number | Name | Date |
| --- | --- | --- |
| 1,185,095 | Hendee | May 30, 1916 |
| 1,358,533 | Elston | Nov. 9, 1920 |
| 1,713,096 | Schott | May 14, 1929 |
| 1,794,758 | Dittmar | Mar. 3, 1931 |
| 1,900,553 | Hampton | Mar. 7, 1933 |
| 2,307,385 | Braxton | Jan. 5, 1943 |

FOREIGN PATENTS

| Number | Country | Date |
| --- | --- | --- |
| 441,079 | Germany | Feb. 18, 1927 |
| 498,502 | Germany | May 23, 1930 |